(12) United States Patent
Mizuno et al.

(10) Patent No.: US 10,805,063 B2
(45) Date of Patent: Oct. 13, 2020

(54) VIRTUAL REALITY VIEWING SYSTEM, REPRODUCTION SYNCHRONIZING METHOD, AND VIRTUAL REALITY VIEWING PROGRAM

(71) Applicant: Alpha Code Inc., Tokyo (JP)

(72) Inventors: Takuhiro Mizuno, Tokyo (JP); Yoshitaka Nomura, Tokyo (JP)

(73) Assignee: Alpha Code Inc., Tokyo (JP)

( * ) Notice: Subject to any disclaimer, the term of this patent is extended or adjusted under 35 U.S.C. 154(b) by 0 days.

(21) Appl. No.: 16/493,550

(22) PCT Filed: Aug. 3, 2017

(86) PCT No.: PCT/JP2017/028272
§ 371 (c)(1),
(2) Date: Sep. 12, 2019

(87) PCT Pub. No.: WO2018/173312
PCT Pub. Date: Sep. 27, 2018

(65) Prior Publication Data
US 2020/0007306 A1    Jan. 2, 2020

(30) Foreign Application Priority Data

Mar. 22, 2017   (JP) .................................. 2017-056476

(51) Int. Cl.
*H04L 7/00*       (2006.01)
*G06F 3/01*       (2006.01)
(Continued)

(52) U.S. Cl.
CPC ........ *H04L 7/0041* (2013.01); *G02B 27/0093* (2013.01); *G06F 3/012* (2013.01); *G06F 3/165* (2013.01)

(58) Field of Classification Search
CPC ... H04L 7/0041; G02B 27/0093; G06F 3/012; G06F 3/165
See application file for complete search history.

(56) References Cited

U.S. PATENT DOCUMENTS 5,662,523 A    9/1997 Yasumaru et al.
2012/0300607 A1*  11/2012 Yamamoto ......... G11B 20/1883
                                                    369/100

(Continued)

FOREIGN PATENT DOCUMENTS

EP    0 691 146 B1    9/1998
ES    2 121 266 T3    11/1998

(Continued)

*Primary Examiner* — Ted M Wang
(74) *Attorney, Agent, or Firm* — Polsinelli PC

(57) ABSTRACT

This VR viewing system is configured such that an external computer 200 outputs sound from an external speaker 300 while an HMD 100 reproduces a VR moving image by means of a built-in computer. The external computer 200 performs a sound output to the external speaker 300, conducts a master management of a reproduction elapsed time of the VR moving image so as to be synchronized with the sound output, detects a difference between the reproduction elapsed time of the VR moving image by the built-in computer of the HMD 100 and the reproduction elapsed time of the VR moving image undergoing the master management by the external computer 200, and adjusts the reproduction of the VR moving image by the built-in computer so as to eliminate the detected difference.

11 Claims, 6 Drawing Sheets

(51) Int. Cl.
*G06F 3/16* (2006.01)
*G02B 27/00* (2006.01)

(56) References Cited

U.S. PATENT DOCUMENTS

2013/0086620  A1     4/2013  Araki
2014/0152895  A1*    6/2014  Kazawa .............. H04N 5/4403
                                                           348/552

FOREIGN PATENT DOCUMENTS

| JP | H08-19662 A | 1/1996 |
| JP | 2011-101196 A | 5/2011 |
| JP | 2013-78048 A | 4/2013 |
| JP | 2014-112766 A | 6/2014 |
| JP | 2014-150408 A | 8/2014 |
| KR | 10-0169540 B1 | 1/1999 |

* cited by examiner

VIRTUAL REALITY VIEWING SYSTEM, REPRODUCTION SYNCHRONIZING METHOD, AND VIRTUAL REALITY VIEWING PROGRAM

CROSS REFERENCE TO RELATED APPLICATIONS

This application is a National Phase filing under 35 U.S.C. § 371 of PCT/JP2017/028272 filed on Aug. 3, 2017; which application in turn claims priority to Application No. 2017-056476 filed in Japan on Mar. 22, 2017. The entire contents of each application are hereby incorporated by reference.

TECHNICAL FIELD

The present invention relates to a virtual reality viewing system, a reproduction synchronizing method, and a virtual reality viewing program, and in particular, is suitable for use in a virtual reality viewing system in which a head mounted display reproduces main contents by a built-in computer while an external computer reproduces sub-contents.

BACKGROUND ART

In recent years, the use of virtual reality (VR) technology that allows a virtual world created in a computer to be experienced as if it were real is spreading. There are various application examples of VR, but an example exists in which by displaying three-dimensional space images on a head mounted display (HMD) mounted by a user, the user may undergo virtually various experiences among the three-dimensional space images drawn for the HMD.

Conventionally, a contents reproduction system is also known in which narration sound is output as sub-contents from a speaker of an HMD in synchronization with video displayed as main contents on a display of the HMD (for example, refer to Patent Document 1).

Patent Document 1: JP-A-2011-101196

DISCLOSURE OF THE INVENTION

There is also an HMD configured to reproduce and display a moving image by a built-in computer. When a VR viewing system with sound is constructed using such a kind of the HMD, the following two forms are considered. One is a form of transmitting and outputting a sound reproduced together with a moving image by the HMD to an external speaker. The other is a form in which sound is reproduced by an external computer different from an HMD, and the reproduced sound is outputted from an external speaker.

However, when the VR viewing system is constructed in the form of the latter, there has been a problem that there may be a time difference between a moving image reproduced by the HMD and the external sound reproduced by the external computer. In particular, when a VR viewing system is constructed in which the same moving image is reproduced on each HMD mounted by a plurality of users while the sound is reproduced by an external computer and output from an external speaker, there may be a difference in a reproduction time of the moving image between the HMDs. In this case, the time difference between the moving image and the external sound will occur variously in each user.

In the future, it is also conceivable to provide an effect in which various contents are presented by an external computer in accordance with the reproduction of the moving image while the moving image is reproduced in the HMD. For example, it is conceivable for an external computer to perform still image reproduction, text display, odor output, tactile presentation by vibration and the like, ventilation, temperature control, and an effect such as generation of water mist and precipitation, depending on the scene of the moving image to be reproduced. Even with regard to reproduction of such contents, a problem that a time difference occurs between the reproduction of the moving image and the reproduction of the contents may similarly occur.

The present invention has been made to solve such problems, and intends to synchronize a moving image as main contents reproduced by a built-in computer of an HMD and displayed on the HMD with sub-contents reproduced by an external computer.

In order to solve the above problems, in a virtual reality viewing system of the present invention in which an external computer controls reproduction of sub-contents while an HMD reproduces a moving image by means of a built-in computer, a master management of a reference reproduction elapsed time relating to the reproduction of the moving image by means of the built-in computer is conducted so as to be synchronized with the reproduction of the sub-contents by means of the external computer. Then, a difference between a reproduction elapsed time of the moving image reproduced in the HMD and the reference reproduction elapsed time undergoing the master management by the external computer is detected, and the reproduction of the moving image by the built-in computer of the HMD is adjusted so as to eliminate the detected difference.

According to the present invention configured as described above, since, when the master management of the reference reproduction elapsed time of the moving image is conducted so as to be synchronized with the reproduction of the sub-contents and a difference occurs between the reference reproduction elapsed time and the reproduction elapsed time of actual moving image, the reproduction of the moving image is adjusted so as to eliminate the difference, the adjusted reproduction elapsed time of the moving image and the reference reproduction elapsed time are synchronized (matched). Here, since the reference reproduction elapsed time is synchronized with the reproduction of the sub-contents, the reproduction of the moving image synchronized with the reference reproduction elapsed time is also synchronized with the reproduction of the sub-contents. Thus, according to the present invention, it is possible to synchronize the moving image as the main contents reproduced by the built-in computer of the HMD and displayed on the HMD with the sub-contents reproduced by the external computer.

DESCRIPTION OF EMBODIMENTS

First Embodiment

Figure 1:
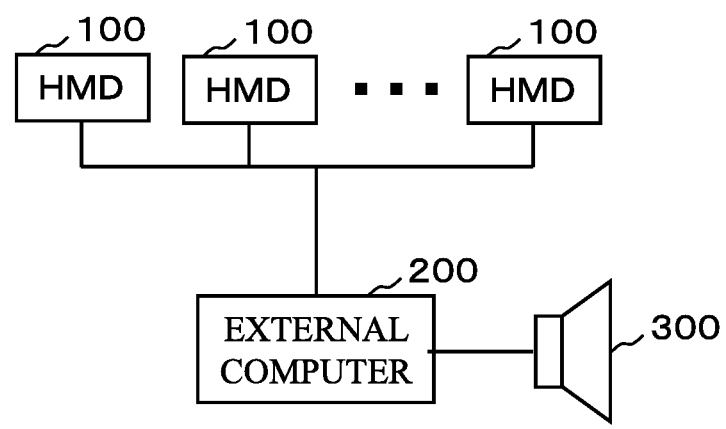
FIG. 1 is a diagram illustrating an exemplary configuration of a VR viewing system according to a first embodiment.

A first embodiment of the present invention will be described below with reference to the drawings. FIG. 1 is a diagram illustrating an exemplary configuration of a virtual reality viewing system (hereinafter referred to as a VR viewing system) according to the first embodiment.

The VR viewing system according to the first embodiment includes a plurality of HMDs 100 each incorporating a computer that reproduces a virtual reality moving image (hereinafter referred to as a VR moving image), an external computer 200, and an external speaker 300. The plurality of HMDs 100 and the external computer 200 are connected by a wired or wireless communication network. The external computer 200 and the external speaker 300 are connected by a wired or wireless connection.

In the VR viewing system of the present embodiment, the plurality of HMDs 100 each reproduces the VR moving image by means of the built-in computer, while the external computer 200 controls reproduction of sub-contents. In the first embodiment, a sound is used as an example of the sub-contents. That is, the external computer 200 reproduces the sound and outputs the same from the external speaker 300. As will be described in detail below, in the first embodiment, the VR moving images individually reproduced by the built-in computers of the plurality of HMDs 100 and the sound reproduced by the external computer 200 are synchronized.

That is, in the first embodiment, the external computer 200 performs a sound output to the external speaker 300 and conducts a master management of a reference reproduction elapsed time of the VR moving image so as to be synchronized with the sound output. Further, a difference between a reproduction elapsed time of the VR moving image by the built-in computer of the HMD 100 and the reference reproduction elapsed time undergoing the master management by the external computer 200 is detected, and the reproduction of the VR moving image by the built-in computer of the HMD 100 is adjusted such that the detected difference is eliminated.

Specifically, the built-in computer of each HMD 100 makes an inquiry to the external computer 200, the difference between the reproduction elapsed time of the VR moving image by the built-in computer and the reference reproduction elapsed time undergoing the master management by the external computer 200 is detected, and the reproduction of the VR moving image by the built-in computer is adjusted so as to eliminate the detected difference. For example, a reproduction position of the VR moving image by the built-in computer is adjusted by fast-forwarding of reproduction, rewinding of reproduction, temporary slow reproduction and the like.

Figure 2:
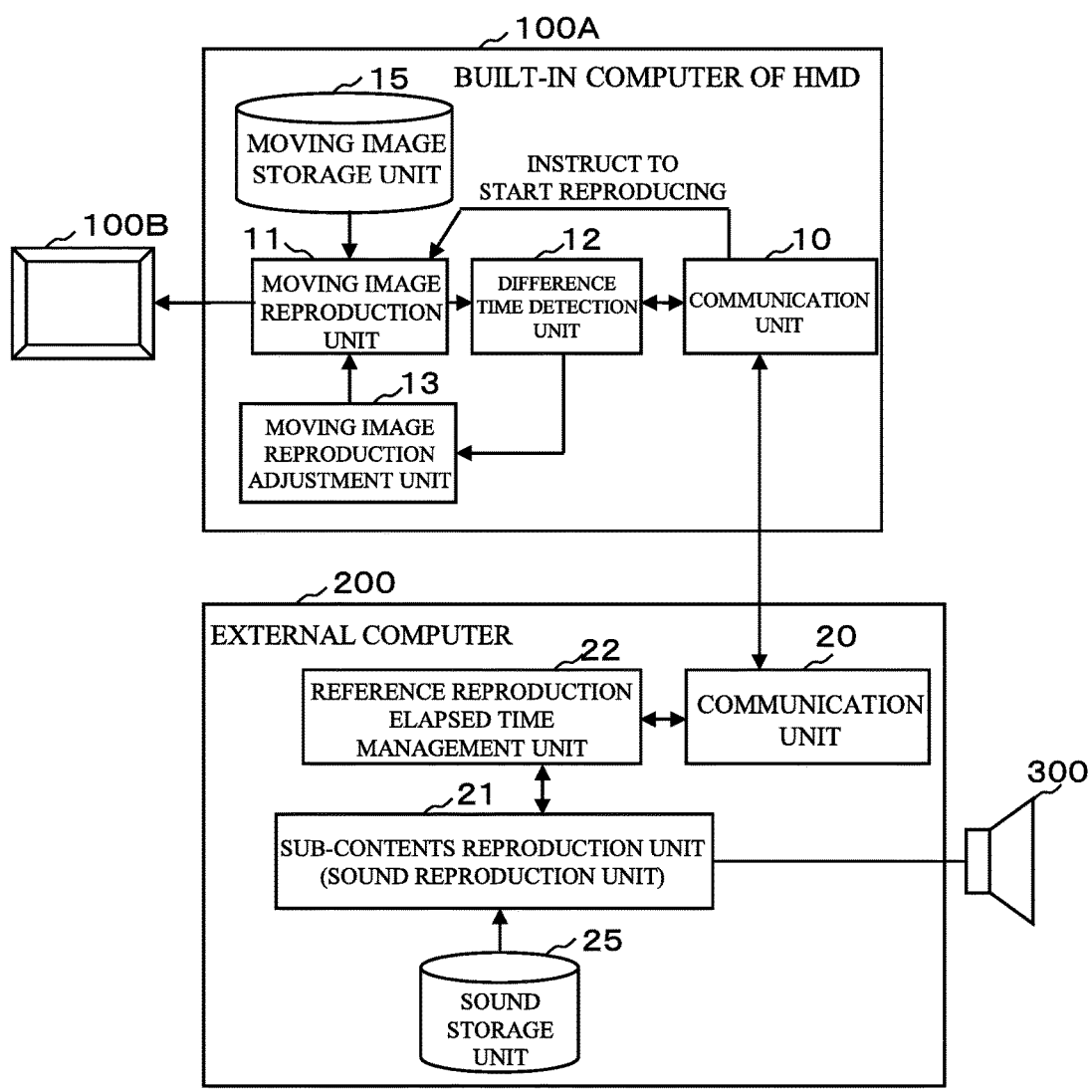
FIG. 2 is a block diagram illustrating an exemplary functional configuration of the VR viewing system according to the first embodiment.

FIG. 2 is a block diagram illustrating an exemplary functional configuration of the VR viewing system according to the first embodiment. As illustrated in FIG. 2, a built-in computer 100A of the HMD 100 includes, as a functional configuration thereof, a communication unit 10, a moving image reproduction unit 11, a difference time detection unit 12, and a moving image reproduction adjustment unit 13. Further, the built-in computer 100A includes a moving image storage unit 15 as a storage medium. On the other hand, the external computer 200 includes, as a functional configuration thereof, a communication unit 20, a sub-contents reproduction unit 21, and a reference reproduction elapsed time management unit 22. Further, the external computer 200 includes a sound storage unit 25 as a storage medium.

Each of functional blocks 10 to 13 included in the built-in computer 100A of the HMD 100 may be configured by any of hardware, digital signal processor (DSP), and software. For example, when configured by the software, each of the functional blocks 10 to 13 is actually configured by including CPU, RAM, ROM, etc. of a computer, and is realized by operating a program stored in a recording medium such as RAM, ROM, hard disk, or semiconductor memory.

Each of functional blocks 20 to 22 included in the external computer 200 may also be configured by any of hardware, DSP, and software. For example, when configured with the software, each of the functional blocks 20 to 22 is actually configured by including CPU, RAM, ROM, etc. of a computer, and is realized by operating a program stored in a recording medium such as RAM, ROM, hard disk, or semiconductor memory.

The communication unit 10 of the built-in computer 100A of the HMD 100 and the communication unit 20 of the external computer 200 perform a bidirectional data communication. The communication units 10 and 20 may be an interface for performing a wireless communication or an interface for performing a wired communication.

A moving image storage unit 15 of the HMD 100 stores an image data of a moving image (VR moving image) representing a three-dimensional space by virtual reality. The moving image stored in the moving image storage unit 15 of each of the plurality of HMDs 100 is basically related to the same VR moving image. Further, the sound storage unit 25 of the external computer 200 stores the sound associated with the VR moving image. The VR moving image stored in the moving image storage unit 15 and the sound stored in the sound storage unit 25 need to be reproduced in the state of being synchronized with each other. For example, it is conceivable that the moving image storage unit 15 stores a moving image without sound, while the sound storage unit 25 stores the sound such as conversation and singing voice of a person, and background music registered in the moving image.

The moving image reproduction unit 11 reproduces the image data of the VR moving image stored in the moving image storage unit 15, and outputs the reproduced image data to a display 100B of the HMD 100 to display the VR moving image on the display 100B. On the other hand, the sub-contents reproduction unit 21 of the external computer 200 reproduces the sound stored in the sound storage unit 25 as an example of the sub-contents, and outputs the reproduced sound from the external speaker 300. In the following, the sub-contents reproduction unit 21 is referred to as a sound reproduction unit 21.

The reference reproduction elapsed time management unit 22 of the external computer 200 conducts a master management of the reference reproduction elapsed time relating to reproduction of VR moving image by the moving image reproduction unit 11 included in the built-in computer 100A of the HMD 100 so as to be synchronized with reproduction of the sound by the sound reproduction unit 21 provided in the external computer 200. That is, the reference reproduction elapsed time management unit 22 is synchronized with the reproduction of the sound by the sound reproduction unit 21 to conduct the master management of the reference reproduction elapsed time of the VR moving image.

As an example, the reference reproduction elapsed time management unit 22 conducts the master management of the reference reproduction elapsed time of the VR moving image by reproducing the VR moving image that is the same as the VR moving image that is reproduced by the moving image reproduction unit 11 of the HMD 100 in synchronization with the reproduction of the sound by the sound reproduction unit 21. Here, the reference reproduction elapsed time management unit 22 instructs the built-in computer 100A of the HMD 100 to start reproducing the VR moving image, and at the same time starts the master management of the reference reproduction elapsed time. In this case, the moving image reproduction unit 11 of the HMD 100 starts reproducing the VR moving image in response to an instruction transmitted from the external computer 200 via the communication units 10 and 20. Thus, all of the reproduction elapsed times of the VR moving image reproduced by the moving image reproduction unit 11 of each HMD 100, the VR moving image reproduced by the reference reproduction elapsed time management unit 22 for the master management of the reference reproduction elapsed time, and the sound reproduced by the sound reproduction unit 21 are synchronized.

Note that, in order to conduct the master management of the reference reproduction elapsed time, it is not necessary for the reference reproduction elapsed time management unit 22 to reproduce the VR moving image itself. For example, the reference reproduction elapsed time management unit 22 may instruct the built-in computer 100A of the HMD 100 to start reproducing the VR moving image simultaneously with the start of sound reproduction by the sound reproduction unit 21, and at the same time, count the elapsed time from the time point of the instruction, thereby conducting the master management with the counted time as the reference reproduction elapsed time of the VR moving image. Further, the reference reproduction elapsed time management unit 22 may start counting the elapsed time, and at the same time, may instruct the sound reproduction unit 21 to start reproducing the sound and instruct the built-in computer 100A of the HMD 100 to start reproducing the VR moving image.

The difference time detection unit 12 of the HMD 100 detects the difference between the reproduction elapsed time of the VR moving image reproduced by the moving image reproduction unit 11 of the HMD 100 and the reference reproduction elapsed time undergoing the master management by the reference reproduction elapsed time management unit 22 of the external computer 200. Specifically, the difference time detection unit 12 makes an inquiry to the reference reproduction elapsed time management unit 22 of the external computer 200 via the communication units 10 and 20 to acquire the reference reproduction elapsed time, and detects the difference between the acquired reference reproduction elapsed time and the reproduction elapsed time of the VR moving image reproduced by the moving image reproduction unit 11.

As described above, since the moving image reproduction unit 11 reproduces the VR moving image in response to the moving image reproduction start instruction from the reference reproduction elapsed time management unit 22, and the reference reproduction elapsed time is synchronized with the reproduction elapsed time of the sound by the sound reproduction unit 21, no difference occurs between the reproduction elapsed time of the VR moving image reproduced by the moving image reproduction unit 11 and the reproduction elapsed time of the sound reproduced by the sound reproduction unit 21 for a while after the start of the reproduction of the VR moving image. That is, no difference occurs between the reproduction elapsed time of the VR moving image and the reference reproduction elapsed time undergoing the master management by the reference reproduction elapsed time management unit 22.

However, when the reproduction of the VR moving image is continued, due to a difference between a load amount of a processing resource of the built-in computer 100A of the HMD 100 and a load amount of a processing resource of the external computer 200, an error between a reference clock of the built-in computer 100A and a reference clock of the external computer 200, or other factors, the reproduction elapsed time of the VR moving image in the HMD 100 may differ from the reproduction elapsed time of the sound in the external computer 200 (=the reference reproduction elapsed time of the VR moving image).

Therefore, the difference time detection unit 12 sequentially detects the difference after the start of reproducing the VR moving image by the moving image reproduction unit 11. That is, the difference time detection unit 12 makes a periodical inquiry to the reference reproduction elapsed time management unit 22 of the external computer 200 at a predetermined time interval, and sequentially detects a difference between the reference reproduction elapsed time thus acquired and the reproduction elapsed time of the VR moving image reproduced by the moving image reproduction unit 11.

When a difference is detected by the difference time detection unit 12, the moving image reproduction adjustment unit 13 of the HMD 100 adjusts the reproduction of the VR moving image by the moving image reproduction unit 11 so as to eliminate the detected difference. Note that, when the value of the difference detected by the difference time detection unit 12 exceeds a predetermined threshold value, the moving image reproduction adjustment unit 13 adjusts the reproduction of the VR moving image.

Here, when the reproduction elapsed time of the VR moving image by the moving image reproduction unit 11 is delayed compared to the reference reproduction elapsed time, the moving image reproduction adjustment unit 13 eliminates a difference in delay by instructing the moving image reproduction unit 11 to perform a fast-forwarding of the reproduction of the VR moving image. When the difference is eliminated, the fast-forwarding is stopped, and the reproduction returns to the original normal reproduction. Conversely, when the reproduction elapsed time of the VR moving image by the moving image reproduction unit 11 is in advance compared to the reference reproduction elapsed time, the difference in advance is eliminated by instructing the moving image reproduction unit 11 to perform rewinding of the reproduction of the VR moving image or slow reproduction. When the difference is eliminated, the rewinding or the slow reproduction is stopped, and the reproduction returns to the original normal reproduction.

Figure 3:
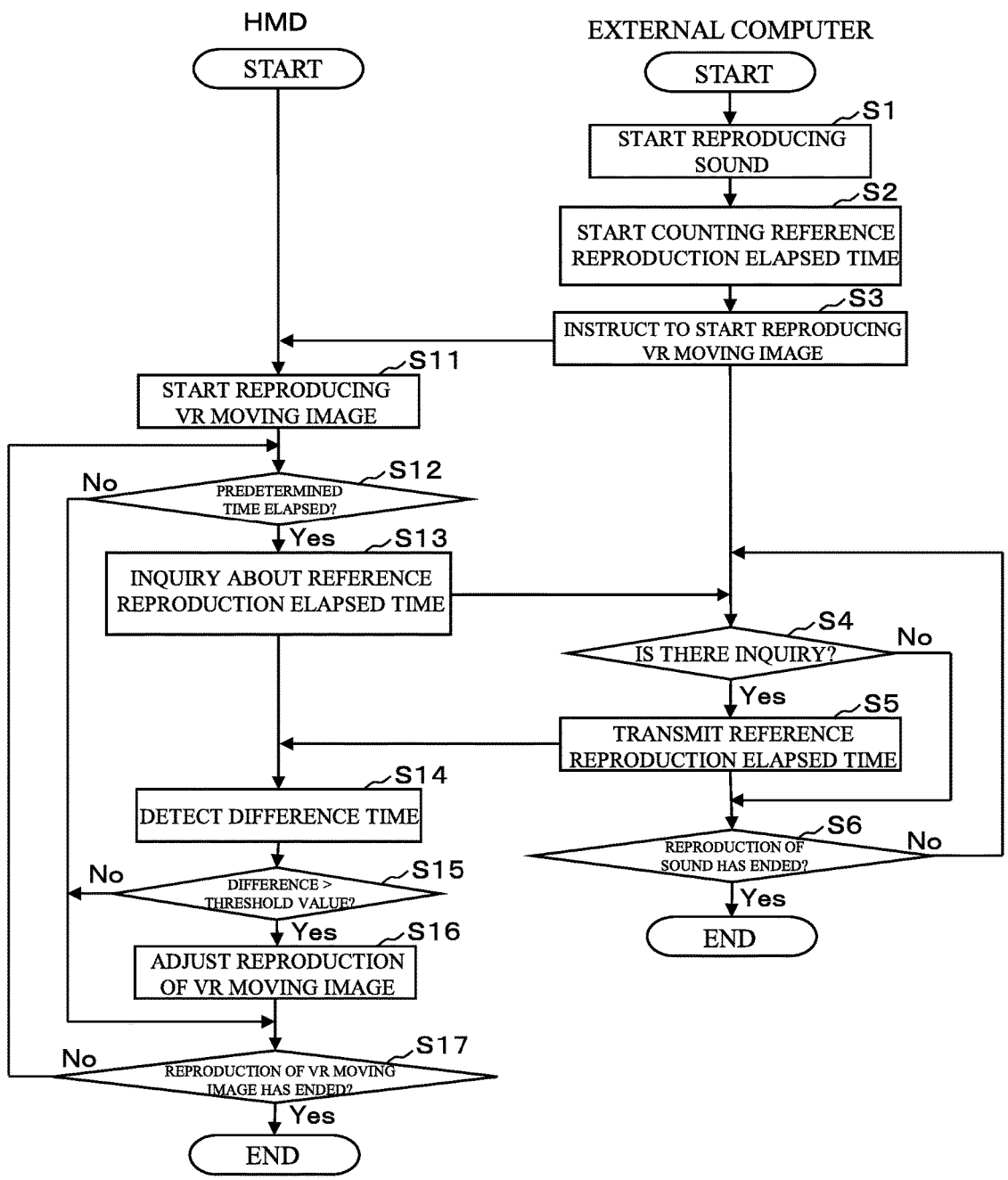
FIG. 3 is a flowchart illustrating an operation example of the VR viewing system according to the first embodiment.

FIG. 3 is a flowchart illustrating an operation example of the VR viewing system according to the first embodiment configured as described above. Note that, although FIG. 3 illustrates an example of operations exchanged between one HMD 100 and the external computer 200, similar operations are executed between each HMD 100 and the external computer 200.

First, the sound reproduction unit 21 of the external computer 200 starts reproduction of the sound stored in the sound storage unit 25 (step S1). At the same time, the reference reproduction elapsed time management unit 22 starts the master management of the reference reproduction elapsed time of the VR moving image (that is, the counting operation of the reference reproduction elapsed time) (step S2). Further, at the same time, the reference reproduction elapsed time management unit 22 transmits a reproduction start instruction of the VR moving image to the HMD 100 via the communication units 10 and 20 (step S3).

The moving image reproduction unit 11 of the HMD 100 starts reproducing the VR moving image stored in the moving image storage unit 15 according to the reproduction start instruction transmitted from the external computer 200 via the communication units 10 and 20 (step S11). At this point of time, the reproduction elapsed time of the VR moving image reproduced by the moving image reproduction unit 11 of the HMD 100, the reference reproduction elapsed time undergoing the master management of the external computer 200, and the reproduction elapsed time of the sound reproduced by the sound reproduction unit 21 are all synchronized with each other.

Thereafter, the difference time detection unit 12 determines whether or not a predetermined time has elapsed (step S12). When the predetermined time has not elapsed, the process proceeds to step S17. On the other hand, when the predetermined time has elapsed, the difference time detection unit 12 makes an inquiry to the reference reproduction elapsed time management unit 22 of the external computer 200 via the communication units 10 and 20 about the reference reproduction elapsed time (step S13).

In the step S3, after the reference reproduction elapsed time management unit 22 transmits the reproduction start instruction to the HMD 100, the reference reproduction elapsed time management unit 22 determines whether or not there is an inquiry from the HMD 100 (step S4), and when there is no inquiry, the process proceeds to the step S6. On the other hand, when there is the inquiry, the reference reproduction elapsed time management unit 22 transmits the reference reproduction elapsed time at that time to the HMD 100 (step S5). The difference time detection unit 12 of the HMD 100 acquires the reference reproduction elapsed time transmitted from the external computer 200.

Then, the difference time detection unit 12 detects the difference between the reference reproduction elapsed time acquired from the external computer 200 and the reproduction elapsed time of the VR moving image reproduced by the moving image reproduction unit 11 (step S14). Then, the moving image reproduction adjustment unit 13 determines whether or not the difference detected by the difference time detection unit 12 exceeds a predetermined threshold value (step S15). If the difference does not exceed the threshold, the process proceeds to step S17. On the other hand, when the difference exceeds the threshold value, the moving image reproduction adjustment unit 13 adjusts the reproduction of the VR moving image by the moving image reproduction unit 11 so as to eliminate the difference (step S16).

Thereafter, the moving image reproduction unit 11 determines whether or not reproduction of the VR moving image stored in the moving image storage unit 15 has ended (step S17). If the reproduction of the VR moving image has not ended yet, the process returns to the step S12. On the other hand, when the reproduction of the VR moving image has ended, the process of the HMD 100 ends.

Further, in the external computer 200, after the reference reproduction elapsed time is transmitted to the HMD 100 in step S5, the sound reproduction unit 21 determines whether or not the reproduction of the sound stored in the sound storage unit 25 has ended (step S6). If the reproduction of the sound has not ended yet, the process returns to step S4. On the other hand, when the reproduction of the sound has ended, the process of the external computer 200 ends.

As described above, since the reproduction of the VR moving image is appropriately adjusted by the moving image reproduction adjustment unit 13 of the HMD 100 in the step S16, a timing at which the reproduction of the VR moving image ends in the step S17 and a timing at which the reproduction of the sound ends in the step S6 are synchronized with each other.

As described in detail above, according to the first embodiment, when the reference reproduction elapsed time of the VR moving image undergoes the master management by the external computer 200 so as to be synchronized with the reproduction of sound in the external computer 200 and a difference occurs between the reference reproduction elapsed time and the actual reproduction elapsed time of the VR moving image, the reproduction of the VR moving image by the moving image reproduction unit 11 is adjusted so as to eliminate the difference. Therefore, the reproduction elapsed time of the adjusted VR moving image and the reference reproduction elapsed time are synchronized (matched) with each other. Here, since the reference reproduction elapsed time is synchronized with the reproduction of the sound, the reproduction of the VR moving image synchronized with the reference reproduction elapsed time is also synchronized with the reproduction of the sound. Thus, according to the first embodiment, it is possible to synchronize the VR moving image as main contents reproduced by the built-in computer 100A of the HMD 100 and displayed on the display 100B of the HMD 100 with the sound as sub-contents reproduced by the external computer 200.

Second Embodiment

Figure 4:
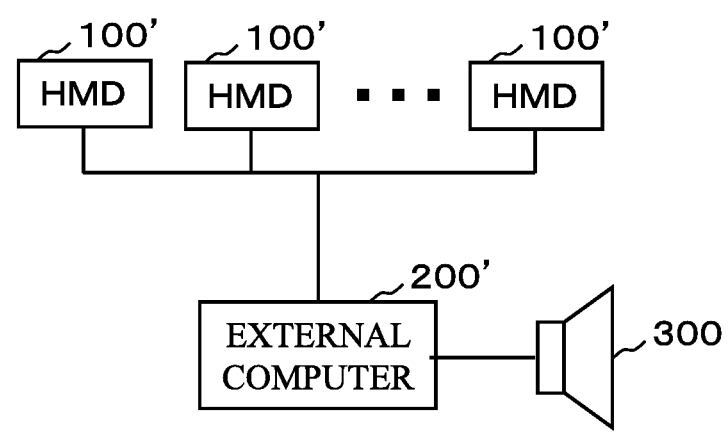
FIG. 4 is a diagram illustrating an exemplary configuration of a VR viewing system according to a second embodiment.

Next, a second embodiment of the present invention will be described with reference to the drawings. FIG. 4 illustrates an exemplary configuration of the VR viewing system according to the second embodiment. The entire configuration of the VR viewing system is similar to that of FIG. 1. However, the contents of the process performed by an HMD 100' and an external computer 200' according to the second embodiment are different from the contents of the process performed by the HMD 100 and the external computer 200 according to the first embodiment.

That is, in the second embodiment, the external computer 200' makes an inquiry to a built-in computer 100A' of each HMD 100', and acquires the reproduction elapsed time of the VR moving image by the built-in computer 100A'. Then, a difference between an actual reproduction elapsed time acquired from each HMD 100' and the reference reproduction elapsed time of the VR moving image undergoing a master management by the external computer 200' is detected by the external computer 200'. Here, the difference is eliminated by outputting an instruction for adjusting the reproduction of the VR moving image by the built-in computer 100A' to the HMD 100' in which the difference occurs.

Specifically, after an instruction to start reproducing the VR moving image is output from the external computer 200' to the built-in computers 100A' of the plurality of HMDs 100' and, in response to the instruction, the built-in computers 100A' of the plurality of HMDs 100' simultaneously start reproducing the VR moving image, the external computer 200' detects a difference between the reproduction elapsed time of the VR moving image acquired from each HMD 100' and the reference reproduction elapsed time. Then, when a difference is detected in any of the HMDs 100', the reproduction of the VR moving image by the built-in computer 100A' is adjusted in response to the instruction transmitted from the external computer 200' to the HMD 100' so as to eliminate the difference in the HMD 100' in which the difference is detected.

Figure 5:
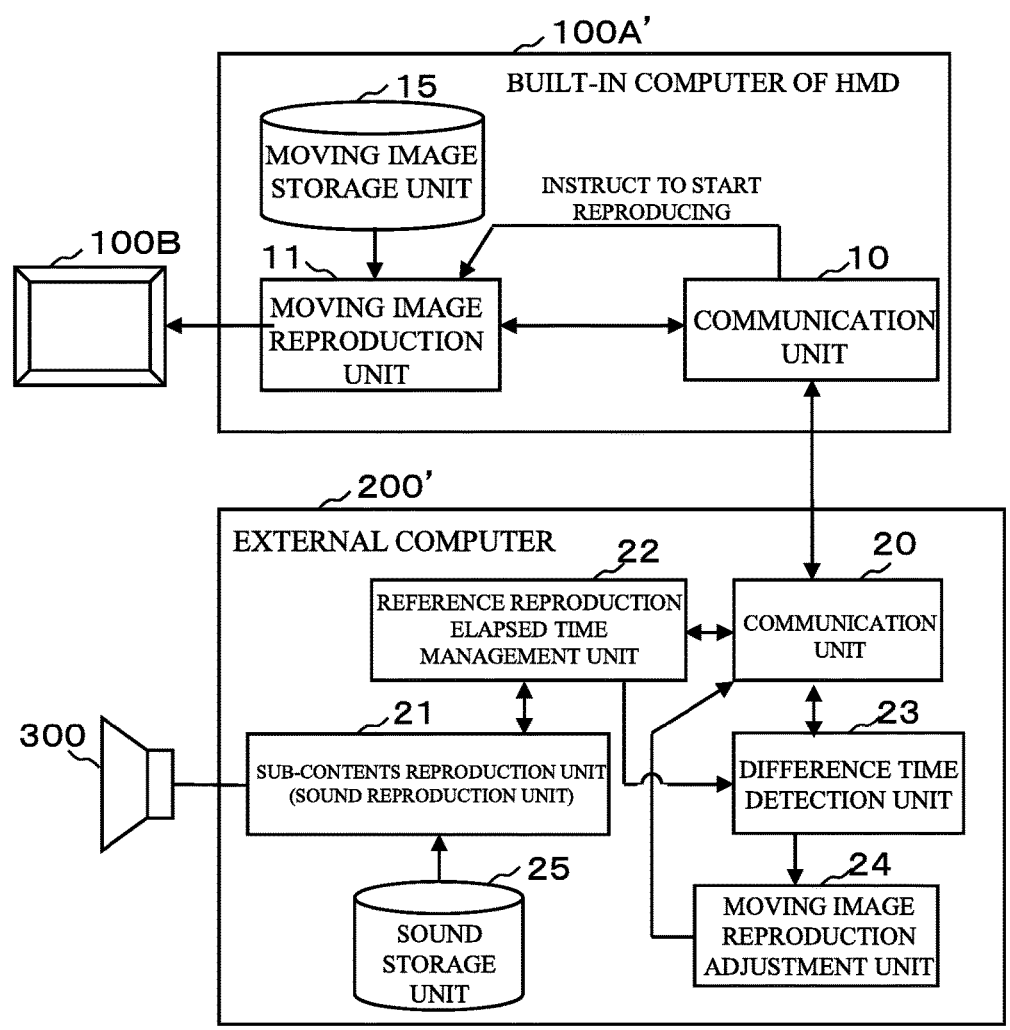
FIG. 5 is a block diagram illustrating an exemplary functional configuration of the VR viewing system according to the second embodiment.

FIG. 5 is a block diagram illustrating an exemplary functional configuration of the VR viewing system according to the second embodiment. Note that, in FIG. 5, those having reference numerals which are the same as the reference numerals illustrated in FIG. 2 have the same functions as those illustrated in FIG. 2, so that redundant descriptions are omitted here.

As illustrated in FIG. 5, the built-in computer 100A' of the HMD 100' includes, as its functional configuration, the communication unit 10 and the moving image reproduction unit 11. Further, the built-in computer 100A' also includes, the moving image storage unit 15 as a storage medium. On the other hand, the external computer 200' includes, as its functional configuration, includes the communication unit 20, the sound reproduction unit 21, the reference reproduction elapsed time management unit 22, a difference time detection unit 23, and a moving image reproduction adjustment unit 24. Further, the external computer 200' also includes the sound storage unit 25 as a storage medium.

The difference time detection unit 23 of the external computer 200' makes an inquiry to the moving image reproduction unit 11 of the HMD 100' via the communication units 10 and 20, thereby acquiring the reproduction elapsed time of the VR moving image reproduced by the moving image reproduction unit 11. Then, a difference between the acquired reproduction elapsed time of the VR moving image and the reference reproduction elapsed time undergoing the master management by the reference reproduction elapsed time management unit 22 is detected. Note that, the reference reproduction elapsed time management unit 22 instructs the built-in computers 100A' of the plurality of HMDs 100' to start reproducing the VR moving image in the same manner as in the first embodiment, and at the same time, starts the master management of the reference reproduction elapsed time.

Here, after the start of reproduction of the VR moving image by the moving image reproduction unit 11 (after the reference reproduction elapsed time management unit 22 instructs the HMD 100' to start reproducing the VR moving image), the difference time detection unit 23 sequentially detects the difference for each of the plurality of HMDs 100'. That is, the difference time detection unit 23 periodically performs the inquiry of the reproduction elapsed time to each HMD 100' at a predetermined time interval, and sequentially detects a difference between the thus acquired reproduction elapsed time of each HMD 100' and the reference reproduction elapsed time undergoing the master management by the reference reproduction elapsed time management unit 22.

When the difference greater than the threshold value is detected in any of the HMDs 100' by the difference time detection unit 23, the moving image reproduction adjustment unit 24 outputs an instruction for adjusting reproduction of the VR moving image by the moving image reproduction unit 11 so as to eliminate the detected difference to the HMD 100' in which the difference is detected. That is, the moving image reproduction adjustment unit 24 outputs an instruction for performing fast-forwarding, rewinding, slow reproduction, or the like of the reproduction of the VR moving image by the moving image reproduction unit 11.

Figure 6:
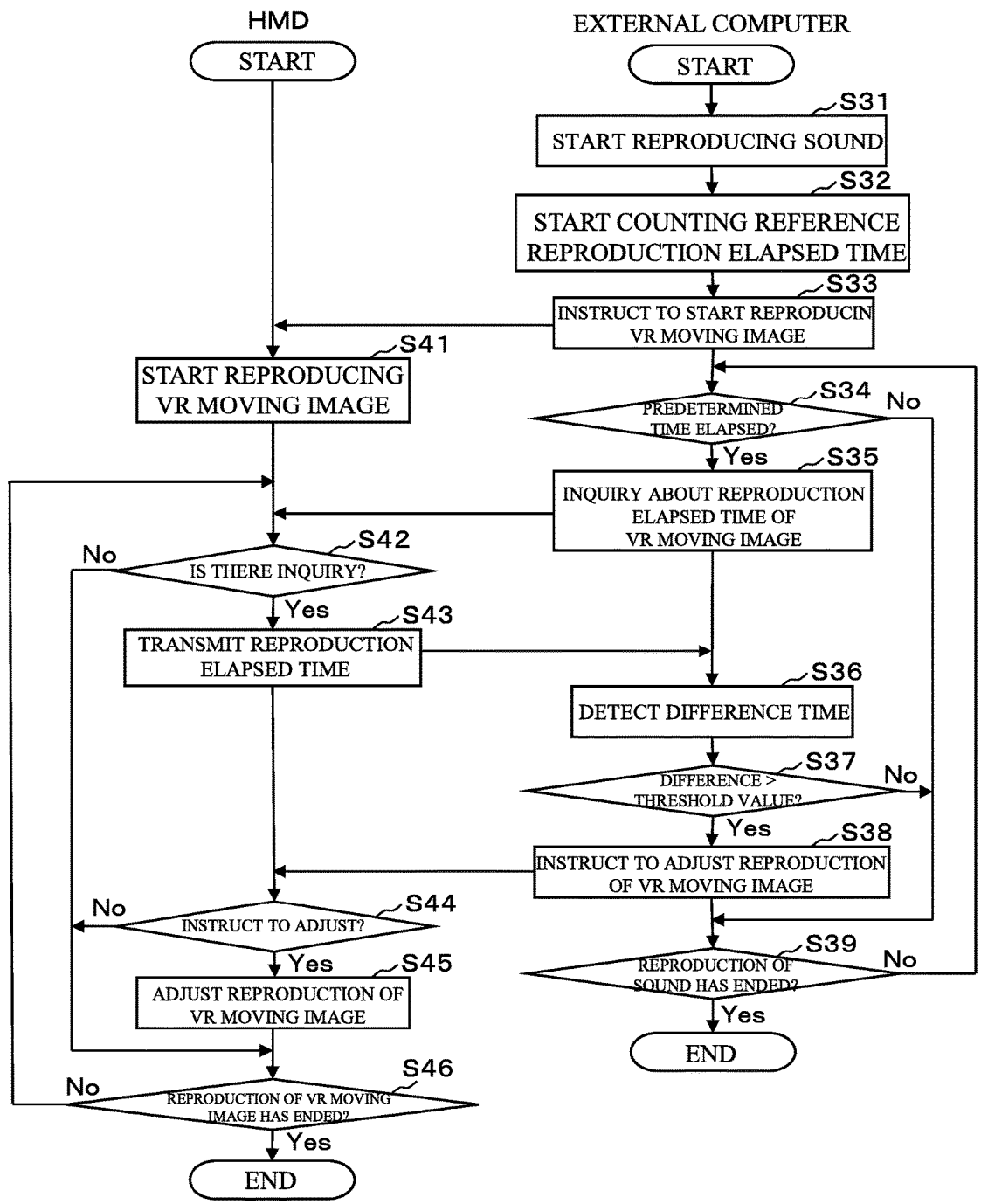
FIG. 6 is a flowchart illustrating an operation example of the VR viewing system according to the second embodiment.

FIG. 6 is a flowchart illustrating an operation example of the VR viewing system according to the second embodiment configured as described above. Note that, although in FIG. 6, an example of operations exchanged between one HMD 100' and the external computer 200' is illustrated, similar operations are executed between each HMD 100' and the external computer 200'.

First, the sound reproduction unit 21 of the external computer 200' starts reproduction of sound stored in the sound storage unit 25 (step S31). At the same time, the reference reproduction elapsed time management unit 22 starts the master management of the reference reproduction elapsed time of the VR moving image (that is, the counting operation of the reference reproduction elapsed time) (step S32). Further, at the same time, the reference reproduction elapsed time management unit 22 transmits a reproduction start instruction of the VR moving image to the HMD 100' via the communication units 10 and 20 (step S33).

The moving image reproduction unit 11 of the HMD 100' starts reproducing the VR moving image stored in the moving image storage unit 15 according to the reproduction start instruction transmitted from the external computer 200' via the communication units 10 and 20 (step S41). At this point of time, the reproduction elapsed time of the VR moving image reproduced by the moving image reproduction unit 11 of the HMD 100', the reference reproduction elapsed time undergoing the master management of the external computer 200', and the reproduction elapsed time of the sound reproduced by the sound reproduction unit 21 are all synchronized with each other.

In the step S33, after the reference reproduction elapsed time management unit 22 transmits the reproduction start instruction to the HMD 100', the difference time detection unit 23 determines whether or not a predetermined time has elapsed (step S34). When the predetermined time has not elapsed, the process proceeds to step S39. On the other hand, when the predetermined time has elapsed, the difference time detection unit 23 makes an inquiry to the moving image reproduction unit 11 of the HMD 100' via the communication units 10 and 20 about the reproduction elapsed time of the VR moving image (step S35).

In the step S41, after the moving image reproduction unit 11 starts reproducing the VR moving image, the moving image reproduction unit 11 determines whether or not there is an inquiry from the external computer 200' (step S42), and when there is no inquiry, the process proceeds to step S46. On the other hand, when there is the inquiry, the moving image reproduction unit 11 transmits the reproduction elapsed time of the VR moving image at that time to the external computer 200' (step S43). The difference time detection unit 23 of the external computer 200' acquires the reproduction elapsed time transmitted from the HMD 100'.

Then, the difference time detection unit 23 detects the difference between the reproduction elapsed time of the VR moving image acquired from the HMD 100' and the reference reproduction elapsed time undergoing the master management by the reference reproduction elapsed time management unit 22 (step S36). Then, the moving image reproduction adjustment unit 24 determines whether or not the difference detected by the difference time detection unit 23 exceeds a predetermined threshold value (step S37). If the difference does not exceed the threshold, the process proceeds to step S39. On the other hand, when the difference exceeds the threshold value, the moving image reproduction adjustment unit 24 transmits to the HMD 100' an instruction for adjusting the reproduction of the VR moving image by the moving image reproduction unit 11 so as to eliminate the difference (step S38).

In the step S43, after the moving image reproduction unit 11 transmits the reproduction elapsed time of the VR moving image to the external computer 200', the moving image reproduction unit 11 determines whether or not the instruction for adjusting the reproduction has been received from the external computer 200' (step S44), and when the instruction is not received, the process proceeds to the step S46. On the other hand, when the instruction is received, the moving image reproduction unit 11 adjusts the reproduction of the VR moving image in accordance with the instruction (step S45).

Thereafter, the moving image reproduction unit 11 determines whether or not reproduction of the VR moving image stored in the moving image storage unit 15 has ended (step S46). If the reproduction of the VR moving image has not ended yet, the process returns to the step S42. On the other hand, when the reproduction of the VR moving image has ended, the process of the HMD 100' ends.

Further, in the external computer 200', the sound reproduction unit 21 determines whether or not the reproduction of the sound stored in the sound storage unit 25 has ended in step S39. If the reproduction of the sound has not ended yet, the process returns to step S34. On the other hand, when the reproduction of the sound has ended, the process of the external computer 200' ends.

As described above, since the moving image reproduction unit 11 appropriately adjusts the reproduction of the VR moving image according to the instruction from the moving image reproduction adjustment unit 24 of the external computer 200' in step S45, a timing at which the reproduction of the VR moving image ends in the step S46 and a timing at which the reproduction of the sound ends in the step S39 are synchronized with each other.

As described in detail above, according to the second embodiment as in the first embodiment, when the reference reproduction elapsed time of the VR moving image undergoes the master management by the external computer 200' so as to be synchronized with the reproduction of sound in the external computer 200' and a difference occurs between the reference reproduction elapsed time and the actual reproduction elapsed time of the VR moving image, the reproduction of the VR moving image by the moving image reproduction unit 11 is adjusted so as to eliminate the difference. Therefore, the reproduction elapsed time of the adjusted VR moving image and the reference reproduction elapsed time are synchronized (matched) with each other. Thus, according to the second embodiment, it is possible to synchronize the VR moving image as main contents reproduced by the built-in computer 100A' of the HMD 100' and displayed on the display 100B of the HMD 100' with the sound as sub-contents reproduced by the external computer 200'.

Note that, in the first and second embodiments, the examples in which the reproduction of the VR operation by the HMDs 100 and 100' is started simultaneously with the start of the master management of the reference reproduction elapsed time by the external computers 200 and 200' have been described, but the present invention is not limited thereto. That is, the present invention can be applied even when reproduction of the VR operation is started by the built-in computers 100A and 100A' of the HMDs 100 and 100', asynchronously with the reference reproduction elapsed time of the VR moving image undergoing the master management by the external computers 200 and 200'.

For example, not a case where the reproduction of the VR moving image is started when one of the plurality of HMDs 100 and 100' receives the instruction of starting the reproduction from the external computers 200 and 200' but a case where the reproduction of the VR moving image is to be started in the middle of already reproducing the VR moving image in other HMDs 100 and 100' corresponds to the asynchronous reproduction. Further, a case where after the plurality of HMDs 100 and 100' start reproducing the VR moving image simultaneously upon receiving the instruction to start the reproduction from the external computers 200 and 200', one of the HMDs 100 and 100' once stops reproducing the VR moving image and then restarts the reproduction, a case where the reproduction is performed from the beginning due to a failure in the reproduction at one of the HMDs 100 and 100', and the like also correspond to the asynchronous reproduction.

When the asynchronous reproduction as described above is performed in the HMDs 100 and 100', it is possible to detect a difference between a reproduction start time of the VR moving image by the built-in computers 100A and 100A' and the reference reproduction elapsed time of the VR moving image undergoing the master management by the external computers 200 and 200', and adjust the reproduction of the VR moving image by the built-in computers 100A and 100A' so as to eliminate the detected difference.

In this case, when reproduction of the VR moving image is started asynchronously with the reference reproduction elapsed time, the difference time detection units 12 and 23 detect the difference at the timing when the reproduction of the VR moving image is started. Then, the moving image reproduction adjustment units 13 and 24 adjust the reproduction of the VR moving image with respect to the built-in computers 100A and 100A' of the HMDs 100 and 100' for which the reproduction of the VR moving image is started asynchronously with the reference reproduction elapsed time, so as to eliminate the difference detected by the difference time detection units 12 and 23.

Further, in the first and second embodiments, the examples in which the plurality of HMDs 100 and 100' are used are described, but one of the HMDs 100 and 100' may be used. Also, in this case, when the above-described difference is detected after the instruction to start reproducing the VR moving image is output from the external computers 200 and 200' to the built-in computers 100A and 100A' of the HMDs 100 and 100', and, in response to the instruction, the built-in computers 100A and 100A' start reproducing the VR moving image, the reproduction of the VR moving image by the built-in computers 100A and 100A' is adjusted so as to eliminate the detected difference.

Further, in the first and second embodiments, the examples in which the HMDs 100 and 100' stores the image data of the VR moving image in the moving image storage unit 15 in advance have been described, but the present invention is not limited thereto. For example, while the image data of the VR moving image stored in advance in the external computers 200 and 200' being transmitted from the external computers 200 and 200' to the HMDs 100 and 100' to be sequentially stored in the moving image storage unit 15, the moving image reproduction unit 11 may read out the image data from the moving image storage unit 15 to reproduce the VR moving image.

Further, in the first and second embodiments, the examples in which the reproduction of the VR moving image and the sound output are synchronized have been described, but the present invention is not limited thereto. That is, the present invention may be applied to a VR viewing system in which while the HMDs 100 and 100' reproduce the VR moving image as the main contents by means of the built-in computers 100A and 100A', the external computers 200 and 200' reproduce the sub-contents other than the sound from an external device.

In this case, the external computers 200 and 200' reproduce the sub-contents with respect to the external device, and conducts the master management on the reference reproduction elapsed time of the VR moving image so as to be synchronized with the reproduction of the sub-contents. Thus, the difference between the reproduction elapsed time of the VR moving image by means of the built-in computers 100A and 100A' of the HMDs 100 and 100' and the reference reproduction elapsed time of the VR moving image undergoing the master management by means of the external computers 200 and 200' is detected, and the reproduction of the VR moving image in the built-in computers 100A and 100A' is adjusted so as to eliminate the detected difference.

As the reproduction of the sub-contents other than the sound, it is possible to use moving image reproduction, text display, odor output, tactile presentation by vibration and the like, ventilation, temperature control, generation of water mist, precipitation, etc., and the like. Here, the sub-contents may be synchronously reproduced continuously from the start of reproducing the VR moving image to the end of the reproduction in the same manner as the reproduction of the sound as described above, or may be synchronously reproduced intermittently at every predetermined timing from the start of reproducing the VR moving image to the end of the reproduction.

In addition, the first and second embodiments are merely illustrative of specific examples for carrying out the present invention, and the technical scope of the present invention should not be construed as limited by the embodiments. That is, the present invention can be implemented in a variety of forms without departing from the spirit or essential characteristics thereof.

REFERENCE SIGNS LIST

11 Moving image reproduction unit
12 Difference time detection unit
13 Moving image reproduction adjustment unit
21 Sub-contents reproduction unit (sound reproduction unit)
22 Reference reproduction elapsed time management unit
23 Difference time detection unit
24 Moving image reproduction adjustment unit 100, 100' HMD
20, 200' External computer
300 External speaker

The invention claimed is:

1. A virtual reality viewing system in which a plurality of head mounted displays reproduces a moving image by means of respective built-in computers thereof while one external computer controls reproduction of sub-contents, the system comprising:
    a reference reproduction elapsed time management unit that conducts a master management of a reference reproduction elapsed time relating to the reproduction of the moving image by means of each of the built-in computers of the plurality of head mounted displays so as to be synchronized with the reproduction of the sub-contents by means of the one external computer,
    a difference time detection unit that detects a difference between a reproduction elapsed time of the moving image reproduced by the built-in computer of the head mounted display and the reference reproduction elapsed time undergoing the master management by the reference reproduction elapsed time management unit, and
    a moving image reproduction adjustment unit that adjusts the reproduction of the moving image by means of the built-in computer of the head mounted display so as to eliminate the difference detected by the difference time detection unit,
    wherein the one external computer includes the reference reproduction elapsed time management unit,
    wherein the external computer includes a sub-contents reproduction unit that controls the reproduction of the sub-contents,
    wherein each of the built-in computers of the plurality of head mounted displays includes a moving image reproduction unit that reproduces the moving image, the difference time detection unit, and the moving image reproduction adjustment unit,
    wherein the difference time detection unit of the head mounted display makes an inquiry to the reference reproduction elapsed time management unit of the external computer to acquire the reference reproduction elapsed time, and detects a difference between the acquired reference reproduction elapsed time and a reproduction elapsed time of the moving image reproduced by the moving image reproduction unit, and
    wherein the moving image reproduction adjustment unit of the head mounted display adjusts the reproduction of the moving image by the moving image reproduction unit so as to eliminate the difference detected by the difference time detection unit.

2. The virtual reality viewing system according to claim 1, wherein the reference reproduction elapsed time management unit of the external computer instructs the built-in computer of the head mounted display to start reproducing the moving image, and at the same time starts the master management of the reference reproduction elapsed time,
    wherein the built-in computer of the head mounted display starts reproducing the moving image in response to the instruction,
    wherein the difference time detection unit sequentially detects the difference after the start of reproducing the moving image, and
    wherein when the difference is detected by the difference time detection unit, the moving image reproduction adjustment unit adjusts the reproduction of the moving image by the built-in computer so as to eliminate the detected difference.

3. The virtual reality viewing system according to claim 1, wherein the reference reproduction elapsed time management unit of the external computer instructs the built-in computers of a plurality of the head mounted displays to start reproducing the moving image, and at the same time starts the master management of the reference reproduction elapsed time,
    wherein the built-in computers of the plurality of the head mounted displays start reproducing the moving image in response to the instruction,
    wherein the difference time detection unit sequentially detects the difference for each of the plurality of the head mounted displays after the start of reproducing the moving image, and
    wherein when the difference is detected in any of the head mounted displays by the difference time detection unit, the moving image reproduction adjustment unit adjusts the reproduction of the moving image by the built-in computer in the head mounted display in which the difference is detected, so as to eliminate the detected difference.

4. The virtual reality viewing system according to claim 1, wherein the built-in computer of the head mounted display is able to start reproducing the moving image, asynchronously with the reference reproduction elapsed time undergoing the master management by the reference reproduction elapsed time management unit of the external computer,
   wherein when the reproduction of the moving image is started asynchronously with the reference reproduction elapsed time, the difference time detection unit detects the difference at a timing when the reproduction of the moving image is started, and
   wherein the moving image reproduction adjustment unit adjusts the reproduction of the moving image in the built-in computer in which the reproduction of the moving image is started asynchronously with the reference reproduction elapsed time, so as to eliminate the difference detected by the difference time detection unit.

5. A virtual reality viewing system in which a plurality of head mounted displays reproduces a moving image by means of respective built-in computers thereof while one external computer controls reproduction of sub-contents, the system comprising:
   a reference reproduction elapsed time management unit that conducts a master management of a reference reproduction elapsed time relating to the reproduction of the moving image by means of each of the built-in computers of the plurality of head mounted displays so as to be synchronized with the reproduction of the sub-contents by means of the one external computer,
   a difference time detection unit that detects a difference between a reproduction elapsed time of the moving image reproduced by the built-in computer of the head mounted display and the reference reproduction elapsed time undergoing the master management by the reference reproduction elapsed time management unit, and
   a moving image reproduction adjustment unit that adjusts the reproduction of the moving image by means of the built-in computer of the head mounted display so as to eliminate the difference detected by the difference time detection unit,
   wherein the one external computer includes the reference reproduction elapsed time management unit,
   wherein the reference reproduction elapsed time management unit of the external computer instructs the built-in computer of the head mounted display to start reproducing the moving image, and at the same time starts the master management of the reference reproduction elapsed time,
   wherein the built-in computer of the head mounted display starts reproducing the moving image in response to the instruction,
   wherein the difference time detection unit sequentially detects the difference after the start of reproducing the moving image, and
   wherein when the difference is detected by the difference time detection unit, the moving image reproduction adjustment unit adjusts the reproduction of the moving image by the built-in computer so as to eliminate the detected difference.

6. The virtual reality viewing system according to claim 5,
   wherein the external computer includes a sub-contents reproduction unit that controls the reproduction of the sub-contents, the difference time detection unit, and the moving image reproduction adjustment unit,
   wherein the built-in computer of the head mounted display includes a moving image reproduction unit that reproduces the moving image,
   wherein the difference time detection unit of the external computer makes an inquiry to the moving image reproduction unit of the head mounted display to acquire the reproduction elapsed time of the moving image reproduced by the moving image reproduction unit, and detects a difference between the acquired reproduction elapsed time of the moving image and the reference reproduction elapsed time undergoing the master management by the reference reproduction elapsed time management unit, and
   wherein the moving image reproduction adjustment unit of the external computer outputs an instruction to adjust the reproduction of the moving image by the moving image reproduction unit to the head mounted display so as to eliminate the difference detected by the difference time detection unit.

7. A virtual reality viewing system in which a plurality of head mounted displays reproduces a moving image by means of respective built-in computers thereof while one external computer controls reproduction of sub-contents, the system comprising:
   a reference reproduction elapsed time management unit that conducts a master management of a reference reproduction elapsed time relating to the reproduction of the moving image by means of each of the built-in computers of the plurality of head mounted displays so as to be synchronized with the reproduction of the sub-contents by means of the one external computer,
   a difference time detection unit that detects a difference between a reproduction elapsed time of the moving image reproduced by the built-in computer of the head mounted display and the reference reproduction elapsed time undergoing the master management by the reference reproduction elapsed time management unit, and
   a moving image reproduction adjustment unit that adjusts the reproduction of the moving image by means of the built-in computer of the head mounted display so as to eliminate the difference detected by the difference time detection unit,
   wherein the one external computer includes the reference reproduction elapsed time management unit,
   wherein the reference reproduction elapsed time management unit of the external computer instructs the built-in computers of a plurality of the head mounted displays to start reproducing the moving image, and at the same time starts the master management of the reference reproduction elapsed time,
   wherein the built-in computers of the plurality of the head mounted displays start reproducing the moving image in response to the instruction,
   wherein the difference time detection unit sequentially detects the difference for each of the plurality of the head mounted displays after the start of reproducing the moving image, and
   wherein when the difference is detected in any of the head mounted displays by the difference time detection unit, the moving image reproduction adjustment unit adjusts the reproduction of the moving image by the built-in computer in the head mounted display in which the difference is detected, so as to eliminate the detected difference.

8. The virtual reality viewing system according to claim 7,
wherein the external computer includes a sub-contents reproduction unit that controls the reproduction of the sub-contents, the difference time detection unit, and the moving image reproduction adjustment unit,
wherein the built-in computer of the head mounted display includes a moving image reproduction unit that reproduces the moving image,
wherein the difference time detection unit of the external computer makes an inquiry to the moving image reproduction unit of the head mounted display to acquire the reproduction elapsed time of the moving image reproduced by the moving image reproduction unit, and detects a difference between the acquired reproduction elapsed time of the moving image and the reference reproduction elapsed time undergoing the master management by the reference reproduction elapsed time management unit, and
wherein the moving image reproduction adjustment unit of the external computer outputs an instruction to adjust the reproduction of the moving image by the moving image reproduction unit to the head mounted display so as to eliminate the difference detected by the difference time detection unit.

9. A virtual reality viewing system in which a plurality of head mounted displays reproduces a moving image by means of respective built-in computers thereof while one external computer controls reproduction of sub-contents, the system comprising:
a reference reproduction elapsed time management unit that conducts a master management of a reference reproduction elapsed time relating to the reproduction of the moving image by means of each of the built-in computers of the plurality of head mounted displays so as to be synchronized with the reproduction of the sub-contents by means of the one external computer,
a difference time detection unit that detects a difference between a reproduction elapsed time of the moving image reproduced by the built-in computer of the head mounted display and the reference reproduction elapsed time undergoing the master management by the reference reproduction elapsed time management unit, and
a moving image reproduction adjustment unit that adjusts the reproduction of the moving image by means of the built-in computer of the head mounted display so as to eliminate the difference detected by the difference time detection unit,
wherein the one external computer includes the reference reproduction elapsed time management unit,
wherein the built-in computer of the head mounted display is able to start reproducing the moving image, asynchronously with the reference reproduction elapsed time undergoing the master management by the reference reproduction elapsed time management unit of the external computer,
wherein when the reproduction of the moving image is started asynchronously with the reference reproduction elapsed time, the difference time detection unit detects the difference at a timing when the reproduction of the moving image is started, and
wherein the moving image reproduction adjustment unit adjusts the reproduction of the moving image in the built-in computer in which the reproduction of the moving image is started asynchronously with the reference reproduction elapsed time, so as to eliminate the difference detected by the difference time detection unit.

10. The virtual reality viewing system according to claim 9,
wherein the external computer includes a sub-contents reproduction unit that controls the reproduction of the sub-contents, the difference time detection unit, and the moving image reproduction adjustment unit,
wherein the built-in computer of the head mounted display includes a moving image reproduction unit that reproduces the moving image,
wherein the difference time detection unit of the external computer makes an inquiry to the moving image reproduction unit of the head mounted display to acquire the reproduction elapsed time of the moving image reproduced by the moving image reproduction unit, and detects a difference between the acquired reproduction elapsed time of the moving image and the reference reproduction elapsed time undergoing the master management by the reference reproduction elapsed time management unit, and
wherein the moving image reproduction adjustment unit of the external computer outputs an instruction to adjust the reproduction of the moving image by the moving image reproduction unit to the head mounted display so as to eliminate the difference detected by the difference time detection unit.

11. A virtual reality viewing system in which a plurality of head mounted displays reproduces a moving image by means of respective built-in computers thereof while one external computer controls reproduction of sub-contents, the system comprising:
a reference reproduction elapsed time management unit that conducts a master management of a reference reproduction elapsed time relating to the reproduction of the moving image by means of each of the built-in computers of the plurality of head mounted displays so as to be synchronized with the reproduction of the sub-contents by means of the one external computer,
a difference time detection unit that detects a difference between a reproduction elapsed time of the moving image reproduced by the built-in computer of the head mounted display and the reference reproduction elapsed time undergoing the master management by the reference reproduction elapsed time management unit, and
a moving image reproduction adjustment unit that adjusts the reproduction of the moving image by means of the built-in computer of the head mounted display so as to eliminate the difference detected by the difference time detection unit,
wherein the one external computer includes the reference reproduction elapsed time management unit,
wherein the external computer includes a sound reproduction unit that reproduces a sound as the sub-contents and outputs the sound to an external speaker, and
wherein the reference reproduction elapsed time management unit conducts the master management of the reference reproduction elapsed time of the moving image synchronously with the reproduction of the sound by the sound reproduction unit,
wherein the reference reproduction elapsed time management unit conducts the master management of the reference reproduction elapsed time of the moving image by reproducing a moving image that is the same as the moving image reproduced by the built-in computer of the head mounted display synchronously with the reproduction of the sound by the sound reproduction unit.

* * * * *